(12) United States Patent
Li et al.

(10) Patent No.: US 8,605,120 B2
(45) Date of Patent: Dec. 10, 2013

(54) INFORMATION INTERACTION METHOD AND INTERFACE CONTROL SYSTEM

(75) Inventors: Changmin Li, Shenzhen (CN); Jinfeng Xuan, Shenzhen (CN); Bo Sheng, Shenzhen (CN); Bo Liu, Shenzhen (CN); Liang Zhang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/591,011

(22) Filed: Aug. 21, 2012

(65) Prior Publication Data

US 2012/0313973 A1 Dec. 13, 2012

Related U.S. Application Data

(63) Continuation of application No. PCT/CN2011/071969, filed on Mar. 18, 2011.

(30) Foreign Application Priority Data

Mar. 23, 2010 (CN) .......................... 2010 1 0131619

(51) Int. Cl.
G09G 5/00 (2006.01)
(52) U.S. Cl.
USPC .......................................... 345/676; 715/730
(58) Field of Classification Search
None
See application file for complete search history.

(56) References Cited

U.S. PATENT DOCUMENTS

| 6,538,656 B1* | 3/2003 | Cheung et al. ................ 345/519 |
| 2002/0033848 A1 | 3/2002 | Sciammarella et al. |
| 2002/0186259 A1 | 12/2002 | Meandzija et al. |
| 2005/0188333 A1 | 8/2005 | Hunleth et al. |
| 2008/0104544 A1* | 5/2008 | Collins et al. ................ 715/846 |
| 2008/0250312 A1 | 10/2008 | Curtis |
| 2009/0046996 A1 | 2/2009 | Harada |
| 2010/0107086 A1 | 4/2010 | Chen et al. |

FOREIGN PATENT DOCUMENTS

| CN | 1504029 A | 6/2004 |
| CN | 1797295 A | 7/2006 |
| CN | 101067786 A | 11/2007 |
| CN | 101076774 A | 11/2007 |
| CN | 101120589 A | 2/2008 |
| CN | 101609403 A | 12/2009 |
| WO | WO 2008/124410 A1 | 10/2008 |

OTHER PUBLICATIONS

Written Opinion of the International Searching Authority issued in corresponding PCT Patent Application No. PCT/CN2011/071969, mailed Jul. 7, 2011.
International Search Report issued in corresponding PCT Patent Application No. PCT/CN2011/071969, mailed Jul. 7, 2011.
Extended European Search Report issued in corresponding European Patent Application No. 11758780.8, mailed Dec. 4, 2012.

(Continued)

Primary Examiner — James A Thompson
Assistant Examiner — David H Chu
(74) Attorney, Agent, or Firm — Brinks Hofer & Gilson (57) ABSTRACT

An information interaction method for improving user experience includes: receiving a control adjustment instruction, where the control adjustment instruction includes identification information of a control; according to the control adjustment instruction, performing an adjustment on each control, so that the control corresponding to the identification information is adjusted to a center position of an interactive interface.

10 Claims, 5 Drawing Sheets

(56) References Cited

OTHER PUBLICATIONS

Office Action issued in corresponding Chinese Patent Application No. 201010131619.8, mailed May 14, 2012.

Office Action issued in corresponding Chinese Patent Application No. 201010131619.8, mailed Jan. 30, 2013.

Application of Information Technology in Education, partial Translation, published Sep. 2004.

* cited by examiner

FIG. 8 ns, the embodi-
INFORMATION INTERACTION METHOD AND INTERFACE CONTROL SYSTEM

CROSS-REFERENCE TO RELATED APPLICATIONS

This application is a continuation of International Application PCT/CN2011/071969, filed on Mar. 18, 2011, which claims priority to Chinese Patent Application No. 201010131619.8, filed with the Chinese Patent Office on Mar. 23, 2010 and entitled "INFORMATION INTERACTION METHOD AND INTERFACE CONTROL SYSTEM", which is hereby incorporated by reference in its entirety.

FIELD OF THE APPLICATION

The present application relates to the field of communications, and in particular, to an information interaction method and an interface control system.

BACKGROUND OF THE APPLICATION

With continuous development of network technologies, users want to communicate with each other face to face through a network. Therefore, a video conference system based on the Internet Protocol (IP, Internet Protocol) and capable of providing a function of fast and convenient exchange of information such as an image, a voice, and data emerges.

A video conference terminal provides a Graphic User Interface (GUI, Graphic User Interface). By operating the interface, a user may perform service control such as holding a meeting, attending a meeting, and viewing a venue. The GUI integrates interface elements such as a window, a menu, and a control, and receives an instruction input (via a mouse, a keyboard, or a touch screen) by the user, feeds back the instruction to a processor for execution, and then outputs a processing result via a screen in real time.

Figure 1:
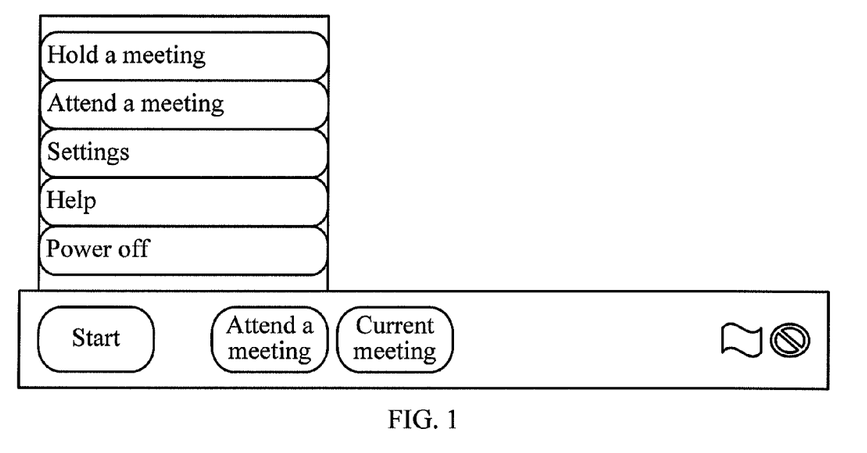
FIG. 1 is a schematic diagram of a GUI in the prior art.

A GUI in the prior art is as shown in FIG. 1. In the GUI, positions of interface elements such as a window, a menu, and a control are fixed, which is disadvantageous for the user to focus on content being operated, thereby reducing operation efficiency of the GUI.

SUMMARY OF THE APPLICATION

The embodiments described below provide an information interaction method and an interface control system, which are capable of improving operation efficiency of a GUI.

The information interaction method provided in an embodiment includes: receiving a control adjustment instruction, where the control adjustment instruction includes identification information of a control; according to the control adjustment instruction, performing an adjustment on each control, so that the control corresponding to the identification information is adjusted to a center position of an interactive interface.

The interface control system provided in an embodiment includes: an instruction receiving apparatus, configured to receive a control adjustment instruction, where the control adjustment instruction includes identification information of a control; and a GUI apparatus, configured to perform an adjustment on each control according to the control adjustment instruction, so that the control corresponding to the identification information is adjusted to a center position of an interactive interface.

Based on the preceding technical solutions, the embodiments have the following advantages:

In the embodiments, the interface control system may adjust a position of each control on the interactive interface according to the control adjustment instruction, so that the control (that is, the control on which a user wants to perform an operation) corresponding to the identification information in the control adjustment instruction is adjusted to the center position of the interactive interface. Therefore, the user is capable of focusing on content of a control being operated, and thereby the operation efficiency of the GUI is improved.

DETAILED DESCRIPTION OF THE INVENTION

The embodiments below provide an information interaction method and an interface control system, which are capable of improving operation efficiency of a GUI.

Figure 2:
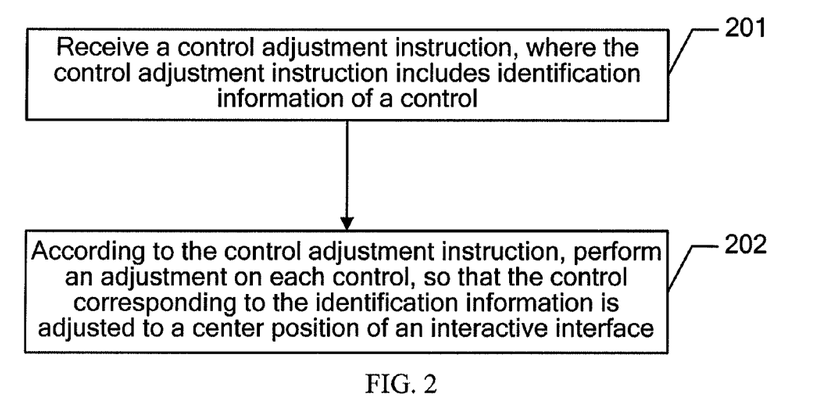
FIG. 2 is a schematic diagram of an information interaction method according to an embodiment.

Referring to FIG. 2, an information interaction method according to an embodiment includes the following steps:

201. Receive a control adjustment instruction, where the control adjustment instruction includes identification information of a control.

In this embodiment, an interface control system may extract the control adjustment instruction from user input information. The control adjustment instruction includes the identification information of the control, and the user input information may be input in the following manners: a remote control, a keyboard, a touch screen or another user input device. In addition, the user input information may also be sent through network transmission by a remote user.

The control adjustment instruction is used for representing a control that a user wants to activate. For example, if the user wants to activate a panel A on the right side of an interactive interface, the user may press a right button on a remote control, and the remote control may send a control adjustment instruction that includes identification information of "a panel on the very right side at present" to the interface control system, or the user may directly press a "panel A" button on the remote control, and then the remote control may send a control adjustment instruction that includes identification information of "panel A" to the interface control system.

202. According to the control adjustment instruction, perform an adjustment on each control, so that the control corresponding to the identification information is adjusted to a center position of the interactive interface.

After receiving the control adjustment instruction, the interface control system obtains the identification information in the control adjustment instruction, and performs an adjustment on each control, so that the control corresponding to the identification information is adjusted to the center position of the interactive interface.

In each of the embodiments, the adjustment may specifically be a scroll adjustment (that is, each control is displayed sequentially in a scroll manner with a point on the screen as a center), or a slide adjustment (that is, each control is displayed in a slide manner with one curve as a track), or a sudden change adjustment (that is, each control takes a predetermined point on the screen as a positioning point, and after an adjustment instruction is received, each control changes the position suddenly and is displayed).

In this embodiment, the interface control system may adjust the position of each control on the interactive interface according to the control adjustment instruction, so that the control corresponding to the identification information in the control adjustment instruction (that is, the control on which a user wants to perform an operation) is adjusted to the center of the interactive interface. Therefore, the user is capable of focusing on content of a control being operated and operation efficiency of the GUI is improved.

Figure 3:
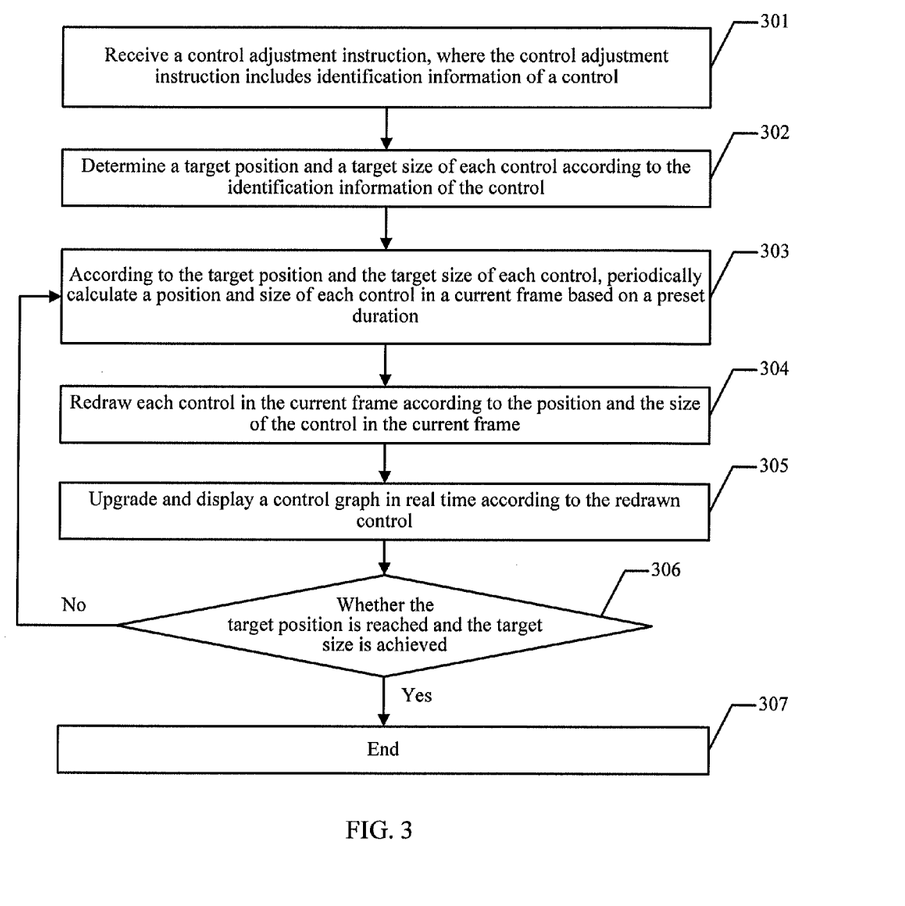
FIG. 3 is a schematic diagram of an information interaction method according to another embodiment.

For ease of understanding, the following uses a specific example to describe the information interaction method in this embodiment in detail. Referring to FIG. 3, an information interaction method according to another embodiment of this embodiment includes the following steps:

301. Receive a control adjustment instruction, where the control adjustment instruction includes identification information of a control.

In this embodiment, an interface control system may receive the control adjustment instruction, where the control adjustment instruction includes the identification information of the control, and the control adjustment instruction may be input by a user via a remote control, a keyboard, a touch screen or another user input device. In addition, the adjustment instruction may also be sent by a remote user located on a network in a video conference system, and transmitted to a local end through the network. The input is received (or input) in a particular manner (for example: pressing, touching, sliding, and dragging) and/or in combination with at least one position (for example: a point, a multi-point, a part, or a region) of an input area.

The control adjustment instruction is used for representing a control that a user wants to activate. For example, if the user wants to activate a panel A on the right side of an interactive interface, the user may press a right button on a remote control, and the remote control may send a control adjustment instruction that includes identification information of "a panel on the very right side at present" to the interface control system, or the user may directly press a "panel A" button on the remote control, and then the remote control may send a control adjustment instruction that includes identification information of "panel A" to the interface control system.

In this embodiment, that a user uses a direction button to adjust a control is taken as an example for illustration. In this case, the identification information included in the control adjustment instruction is direction identification information of the control.

Figure 4:
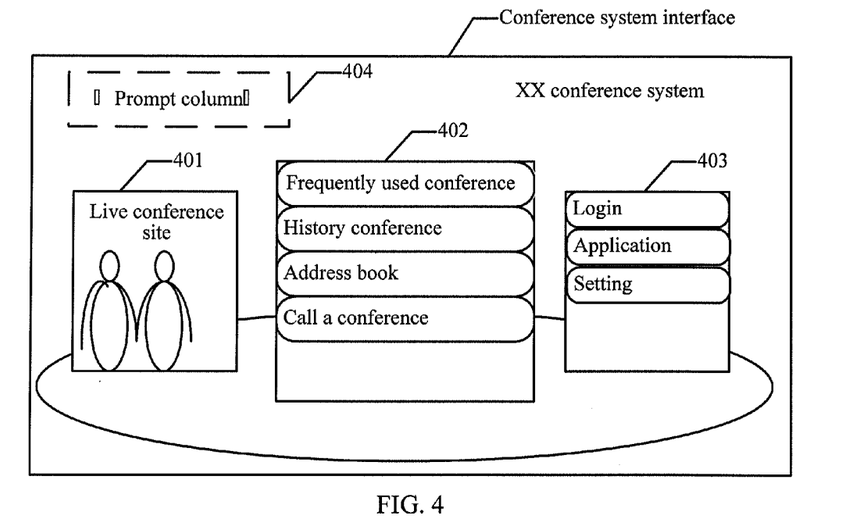
FIG. 4 is a schematic diagram of a GUI according to an embodiment.

The user interactive interface in this embodiment may be as shown in FIG. 4, where the interface includes three controls, namely, a control 401, a control 402, and a control 403, and the interface may also include a prompt column 404 to prompt the user with an operation that is able to be performed at present or help information and so on.

The control 401 may be a video play control for live broadcasting a conference site, the control 402 may be a service function control for implementing some common service functions, and the control 403 may be an assistant function control for implementing an assistant function of conference control.

It should be noted that, the preceding content is merely taken as an example for illustration in this embodiment. In an actual application, a control with another function or a different number of controls may also be adopted, and a specific control type and the number of controls are not limited herein.

In this embodiment, assume that the identification information in the control adjustment instruction is: "a control on the very right side at present", indicating that the user wants to activate the control 403.

302. Determine a target position and a target size of each control according to the identification information of the control.

After obtaining the identification information in the control adjustment instruction, the interface control system knows that the user wants to activate the control 403, and may determine the target position and the target size of each control according to the identification information.

It should be noted that, to make the control activated by the user easier to operate, a display area of the activated control may be enlarged. For example, the display area of the activated control may be 20% larger than a display area of the control before the control is activated. A specific value by which the display area is enlarged in the actual application is not limited herein.

Figure 5:
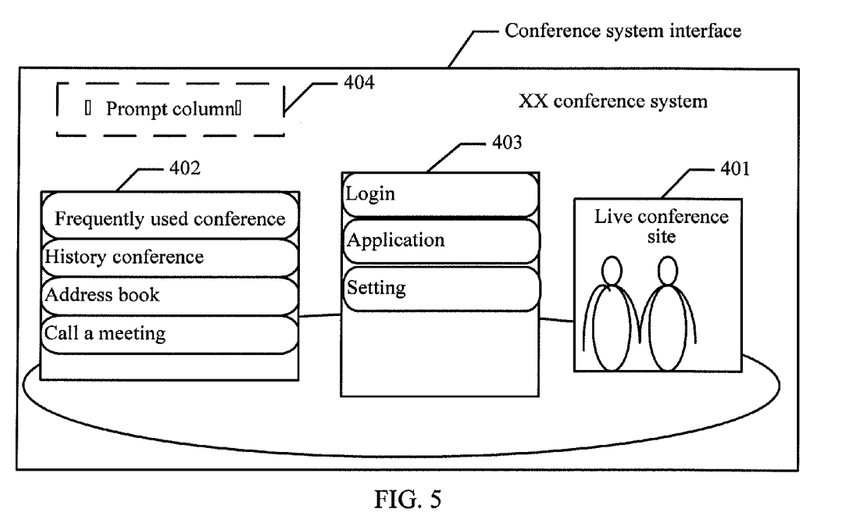
FIG. 5 is a schematic diagram of a GUI according to another embodiment.

The interface control system determines that the control 403 needs to be scrolled to the center position of the interactive interface, and enlarges a display area of the control 403. To prevent the control from overlapping, each other control needs to be scrolled at the same time. In this case, the interface control system determines that the control 402 needs to be scrolled to the very left side, reduces a display area of the control 402 to restore a size before the control 402 is activated, and scrolls the control 401 to the very right side at the same time with the display area unchanged. The finally determined interactive interface displayed after the controls are scrolled is as shown in FIG. 5.

303. According to the target position and the target size of each control, periodically calculate a position and a size of each control in a current frame based on a preset duration.

Figure 6:
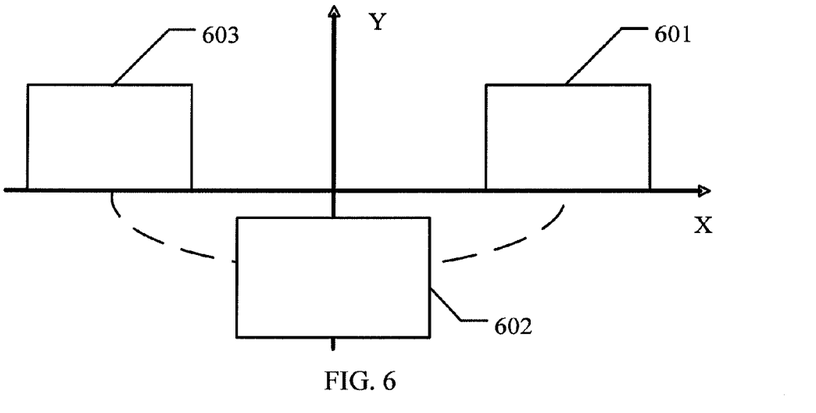
FIG. 6 is a schematic diagram of a scrolling track of a control according to an embodiment.

The target position and the target size of each control is determined in step 302, that is, each control may be scrolled and a specific scrolling track may be a semi-elliptical track as shown in FIG. 6. If the control is scrolled from 601 to 602, the display area increases accordingly; if the control is scrolled from 602 to 603, the display area decreases accordingly. Display areas of the same control at 601 and 602 may be the same.

It should be noted that, FIG. 6 is only an example of the scrolling track in this embodiment. In the actual application, the specific scrolling track may be another track besides the semi-elliptical track shown in FIG. 6, such as a circle, a triangle, and a rectangle, which is not limited herein.

To present a three-dimensional rotation effect of a control during scrolling, the position and the size of each control in the current frame may also be calculated periodically based on a preset duration and according to the target position and the target size.

Assume that a timing message is generated every 0.01 second. In this case, when receiving a timing message, the interface control system may calculate a current position and size of each control within the current 0.01 second.

304. Redraw each control in the current frame according to the position and the size of each control in the current frame.

After the interface control system calculates and obtains the position and the size of each control in the current frame, the position and the size of each control may be redrawn according to the information.

305. Update and display a control graph in real time according to the redrawn control.

After the redrawing, the control graph may be updated and displayed to the user according to a redrawing result.

306. Determine whether the control reaches the target position and achieves the target size, if no, repeat step 303, and if yes, perform step 307.

During the control scrolling process, steps 303-305 will be performed repeatedly if the target position is not reached and the target size is not achieved, that is, in this embodiment, the interface control system may periodically obtain a timing message and calculate the position and the size of each control in the current frame every time a timing message is obtained.

Taking a control as an example, the control needs to be scrolled from the position 601 to the position 602 in FIG. 6, and the display area of the control needs to be enlarged by 20%. Assume that a whole scrolling process of the control takes 1 second in total. In this case, the interface control system calculates the current position and size of the control every 0.01 second from the moment the control begins to be scrolled, and the current position and size of the control are calculated 100 times during the whole scrolling process.

Every time after the position and the size of the control are calculated, the control may be redrawn and the control graph may be updated and displayed in real time according to the redrawn control, that is, during the whole scrolling process, the control graph is updated 100 times in total. Due to a theory of persistence of vision, the user observes a continuous moving animation effect.

307. End the process.

When each control reaches the target position and achieves the target size, end the process.

It should be noted that, during the scrolling process of a control, relevant content on each control may also move with the control. Video playing is taken as an example in the following for illustration.

Refer to FIG. 4 and FIG. 5, in which the control 401 is a video play control. As the control is located in the interactive interface, content played by the control 401 is media information mixing video information and graphic information of the interactive interface. The specific mixing method may be as follows:

The interface control system obtains the video information and the graphic information of the interactive interface, and performs alpha mixing (alpha mixing) on the graphic information on a graphic layer and the video information on a video layer, and plays media information obtained after the mixing on the video play control.

The interface control system sets a graph of a region where the control 401 is located to a transparent color, so that the video information below may be displayed, and sets the video information on the video layer the same as the region of the control 401 at the same time. In this way, the media information after the graphic information and the video information are mixed may be played on the control 401.

When the control 401 is scrolled, for example, from a position at the very left side shown in FIG. 4 to a position at the very right side shown in FIG. 5, content on the control 401 needs to be moved at the same time. The specific manner may be as follows:

The interface control system obtains the current position and the current size of the control 401 in real time, for example, the interface control system obtains the current position and the current size of the control 401 every 0.01 second. Because the interface control system may calculate the current position and the current size of each control in real time in the preceding step 303, the relevant information may be obtained directly here;

the interface control system adjusts the current position and the current size of the video information on the video layer so that the current position and the current size of the video information match the current position and current size of the control 401;

the interface control system performs alpha mixing again on the graphic information on the graphic layer and the adjusted video information on the video layer; and the interface control system plays the remixed media information on the control 401.

Figure 7:
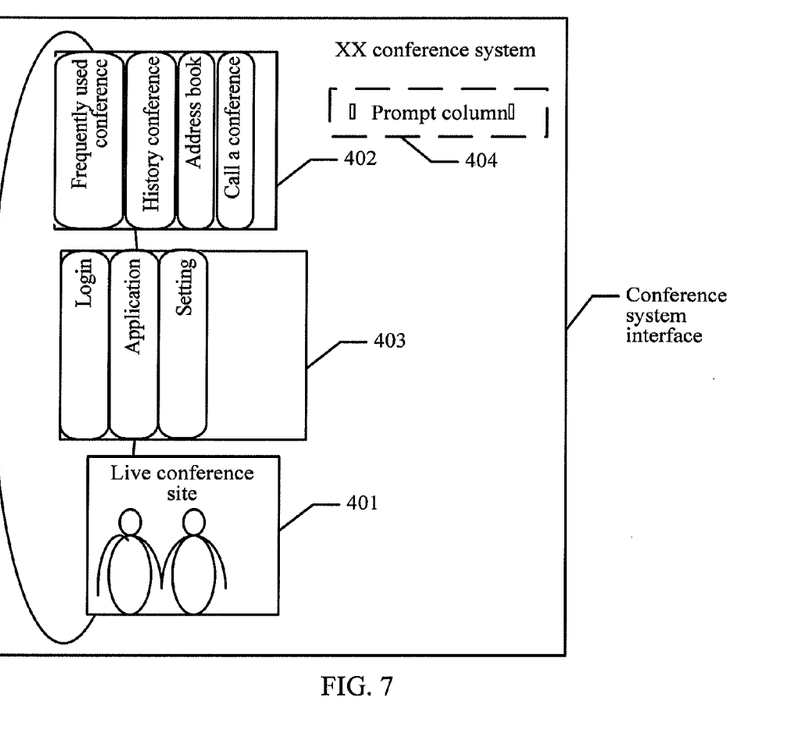
FIG. 7 is a schematic diagram of a GUI according to still another embodiment.

In the preceding embodiment, that controls are arranged horizontally and are scrolled horizontally is taken as an example. In the actual application, the controls may be arranged vertically and scrolled vertically, as shown in FIG. 7. The specific scrolling process is similar to the preceding horizontal scrolling process, which is not described again herein.

In this embodiment, the interface control system may perform a scroll adjustment on the position of each control on the interactive interface according to the control adjustment instruction so that a control (that is, the control on which a user wants to perform an operation) corresponding to the identification information in the control adjustment instruction is scrolled to the center position of the interactive interface. Therefore, the user is capable of focusing on content of a control being operated, and thereby operation efficiency of the GUI is improved.

In addition, the interface control system may update the graph of the scrolling control in real time so that the user is capable of observing a continuous moving animation effect, thereby further improving the operation efficiency of the GUI.

Moreover, when the video play control is scrolling, the media information displayed on the video play control may be updated and moved by the interface control system accordingly so that the media information may move with the video play control, thereby further improving the operation efficiency of the GUI.

Figure 8:
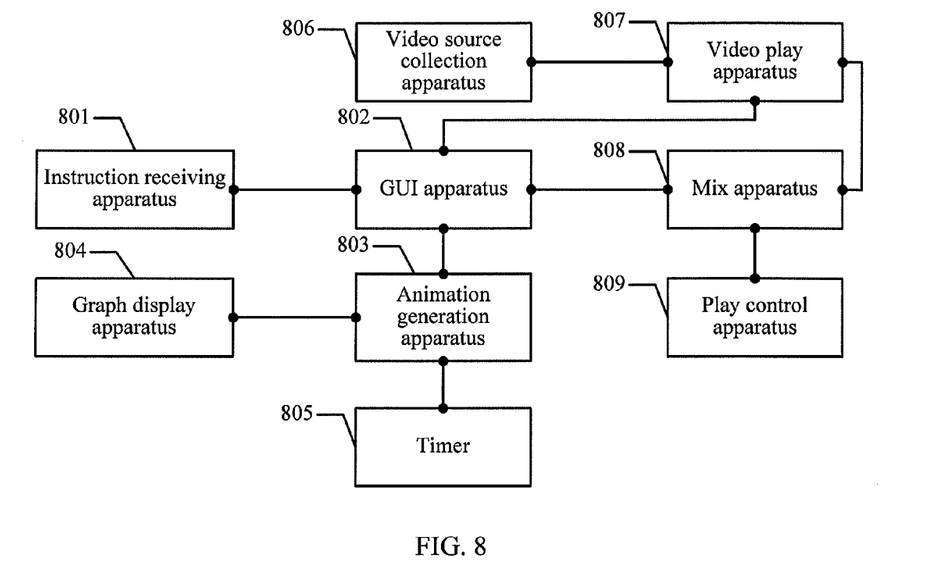
FIG. 8 is a schematic diagram of an interface control system according to an embodiment.

The interface control system in the embodiments is described in the following. Referring to FIG. 8, an interface control system according to an embodiment includes an instruction receiving apparatus 801 and a GUI apparatus 802.

The instruction receiving apparatus 801 is configured to receive a control adjustment instruction, where the control adjustment instruction includes identification information of a control.

The instruction receiving apparatus 801 may be various sensors, for example: a pressure sensor, a thermal sensor, and so on. Various input information input by a user input device is obtained through the various sensors, where the user input device may include: a keyboard, a mouse, or a touch screen (a resistive touch screen or a capacitive touch screen), and through these user input devices, operation information of a user may be converted to physical information such as force, heat, light, and electricity. Identification of the control adjustment instruction is implemented through the instruction receiving apparatus 801.

The GUI apparatus 802 is configured to perform an adjustment on each control according to the control adjustment instruction so that the control corresponding to the identification information is adjusted to a center position of an interactive interface.

The GUI apparatus 802 determines each control on which an operation needs to be performed according to the identification information of the control in the control adjustment instruction, parses the user operation information to obtain target position information, and controls a corresponding control to implement an adjustment operation.

In each of the embodiments, the adjustment may specifically be a scroll adjustment (that is, each control is displayed sequentially in a scroll manner with a point on a screen as a center), or a slide adjustment (that is, each control is displayed in a slide manner with one curve as a track), or a sudden change adjustment (that is, each control takes a predetermined point on the screen as a positioning point, and after an adjustment instruction is received, each control changes the position suddenly and is displayed).

Optionally, the interface control system in this embodiment may further include:

an animation generation apparatus 803 and a graph display apparatus 804.

The animation generation apparatus 803 is configured to periodically calculate a position and a size of each control in a current frame based on a preset duration and according to a target position and a target size of each control determined by the GUI apparatus 802.

The GUI apparatus 802 is further configured to determine the target position and the target size of each control according to the identification information, and redraw each control in the current frame according to the position and the size of each control in the current frame that are calculated by the animation generation apparatus 803.

The graph display apparatus 804 is configured to update and display a control graph in real time according to the redrawn control.

Optionally, the interface control system in this embodiment may further include:

a timer 805, configured to periodically generate a timing message to trigger the animation generation apparatus 803 to perform a corresponding operation.

It should be noted that, in this embodiment, if the animation generation apparatus 803 is capable of calculating the position and the size of each control in the current frame according to a timing message sent by a clock external to the system, the interface control system may not include the timer 805. The timer may be implemented in a hardware mode or a software mode, or in a hardware plus software mode.

Optionally, the interface control system in this embodiment may further include:

a video source collection apparatus 806, a video play apparatus 807, a mix apparatus 808, and a play control apparatus 809.

The video source collection apparatus 806 is configured to collect video information.

The video play apparatus 807 is configured to play the video information collected by the video source collection apparatus 806 on a video layer.

The GUI apparatus 802 is further configured to generate graphic information of the interactive interface, and present the graphic information on a graphic layer.

The mix apparatus 808 is configured to obtain media information by performing alpha mixing on the graphic information on the graphic layer and the video information on the video layer.

The play control apparatus 809 is configured to play the media information on a video play control.

In this embodiment, when the video play control is scrolled, in order to enable the media information on the video play control to move with the video play control, the GUI apparatus 802 is further configured to obtain the current position and the current size of the video play control in real time when the video play control is being adjusted, and send the current position and the current size of the video play control to the video play apparatus 807.

The video play apparatus 807 is further configured to adjust a current position and a current size of the video information on the video layer so that the current position and the current size of the video information match the current position and current size of the video play control.

The mix apparatus 808 is further configured to perform alpha mixing again on the graphic information on the graphic layer and the adjusted video information on the video layer.

The play control apparatus 809 is further configured to play the remixed media information on the video play control.

For ease of understanding, the following uses a specific application scenario to describe the interface control system in this embodiment in detail.

In this embodiment, the instruction receiving apparatus 801 may receive a control adjustment instruction, where the control adjustment instruction includes identification information of a control, and the control adjustment instruction may be input by a user via a remote control, a keyboard, a touch screen or another user input device. In addition, the adjustment instruction may also be sent by a remote user and transmitted to a local end through a network. The input is received (or input) in a particular manner (for example: pressing, touching, sliding, and dragging) and/or in combination with at least one position (for example: a point, a multi-point, a part, or a region) of an input area.

In this embodiment, that a user uses a direction button to adjust a control is taken as an example for illustration. In this case, the identification information included in the control adjustment instruction is direction identification information of the control.

A user interactive interface in this embodiment may be as shown in FIG. 4, where the interface includes three controls, namely, a control 401, a control 402, and a control 403, and the interface may also include a prompt column 404 to prompt the user with an operation that is able to be performed at present or help information and so on.

The control 401 may be a video play control for live broadcasting a conference site, the control 402 may be a service function control for implementing some common service functions, and the control 403 may be an assistant function control for implementing an assistant function of conference control.

It should be noted that, the preceding content is merely taken as an example for illustration in this embodiment. In an actual application, a control with another function or a different number of controls may also be adopted, and a specific control type and the number of controls are not limited herein.

In this embodiment, assume that the identification information in the control adjustment instruction is: "a control on the very right side at present", indicating that the user wants to activate the control 403.

After the instruction receiving apparatus 801 obtains the identification information in the control adjustment instruction, the GUI apparatus 802 knows that the user wants to activate the control 403, and the GUI apparatus 802 determines the target position and the target size of each control according to the identification information.

It should be noted that, to make the control activated by the user easier to operate, a display area of the activated control may be enlarged. For example, the display area of the activated control may be 20% larger than a display area of the control before the control is activated. A specific value in the actual application is not limited herein.

The GUI apparatus 802 determines that the control 403 needs to be scrolled to the center position of the interactive interface, and enlarges a display area of the control 403. To prevent the control from overlapping, each other control needs to be scrolled at the same time. In this case, the GUI apparatus 802 determines that the control 402 needs to be scrolled to the very left side, reduces a display area of the control 402 to restore a size before the control 402 is activated, and scrolls the control 401 to the very right side at the same time with the display area unchanged. The finally determined interactive interface displayed after the controls are scrolled is as shown in FIG. 5.

After the GUI apparatus 802 determines the target position and the target size of each control, as long as the control has not reached the target position or achieved the target size, the animation generation apparatus 803 may periodically obtain a timing message and calculate the position and the size of each control in the current frame every time a timing message is obtained.

Taking a control as an example, the control needs to be scrolled from the position 601 to the position 602 in FIG. 6, and the display area of the control needs to be enlarged by 20%. Assume that a whole scrolling process of the control takes 1 second in total. In this case, the animation generation apparatus 803 calculates the current position and size of the control every 0.01 second from the moment the control begins to be scrolled, and the current position and size of the control are calculated 100 times during the whole scrolling process.

Every time after the animation generation apparatus 803 calculates the position and the size of the control, the GUI apparatus 802 may redraw the control, and the graph display apparatus 804 updates and displays the control graph in real time according to the redrawn control, that is, during the whole scrolling process, the control graph is updated 100 times in total. Due to a theory of persistence of vision, the user observes a continuous moving animation effect.

When each control reaches the target position and achieves the target size, end the process.

It should be noted that, during the scrolling process of a control, relevant content on each control may also move with the control. Video playing is taken as an example in the following for illustration.

Refer to FIG. 4 and FIG. 5, in which the control 401 is a video play control. As the control is located in the interactive interface, content played by the control 401 is the media information mixing video information and graphic information of the interactive interface. The specific mixing method may be as follows:

the video source collection apparatus 806 collects the video information, the video play apparatus 807 plays the video information collected by the video source collection apparatus 806 on the video layer, and the GUI apparatus 802 generates the graphic information of the interactive interface, and displays the graphic information on the graphic layer; and the mix apparatus 808 performs alpha mixing on the graphic information on the graphic layer and the video information on the video layer, and the play control apparatus 809 plays the mixed media information on the video play control.

When the control 401 is scrolled, for example, from a position at the very left side shown in FIG. 4 to a position at the very right side shown in FIG. 5, content on the control 401 needs to be moved at the same time. The specific manner may be as follows:

the GUI apparatus 802 obtains the current position and the current size of the control 401 in real time, and the video play apparatus 807 adjusts the current position and the current size of the video information on the video layer so that the current position and the current size of the video information match the current position and current size of the control 401;

the mix apparatus 808 performs alpha mixing again on the graphic information on the graphic layer and the adjusted video information on the video layer; and the play control apparatus 809 plays the remixed media information on the control 401.

In this embodiment, the GUI apparatus 802 may perform a scroll adjustment on the position of each control on the interactive interface according to the control adjustment instruction so that a control (that is, the control on which a user wants to perform an operation) corresponding to the identification information in the control adjustment instruction is scrolled to the center position of the interactive interface. Therefore, the user is capable of focusing on content of a control being operated, and thereby GUI user experience is improved.

In addition, the animation generation apparatus 803, the GUI apparatus 802, and the graph display apparatus 804 may update the graph of the scrolling control in real time so that the user is capable of observing a continuous moving animation effect, thereby further improving the user experience.

Moreover, when the video play control is scrolling, the media information displayed on the video play control is updated and moved by the interface control system accordingly so that the media information may move with the video play control, thereby further improving the user experience.

Persons skilled in the art may understand that all or part of the steps of the embodiments may be realized through a program instructing relevant hardware. The program may be stored in a computer readable storage medium, and the storage medium may be a Read-Only Memory (ROM), a magnetic disk, an optical disk, and so on.

The foregoing describes the information interaction method and the interface control system that are provided in the present invention in detail. Persons of ordinary skill in the art may make modifications on the specific embodiments and the application scope according to the idea of the embodiments. Therefore, the content of this specification should not be understood as a limitation on the claims.

What is claimed is:

1. An information interaction method, comprising:
receiving a control adjustment instruction, wherein the control adjustment instruction comprises identification information of a control;
performing an adjustment on each control of a plurality of controls according to the control adjustment instruction so that the control corresponding to the identification information is adjusted to a center position of an interactive interface;
wherein performing of the adjustment on the control comprises:
determining a target position and a target size of each control according to the identification information of the control;
periodically calculating a position and a size of each control in a current frame based on a preset duration and according to the target position and the target size;
redrawing each control in the current frame according to the position and the size of the control in the current frame;
updating and displaying a control graph in real time according to the redrawn control; and when the control corresponding to the identification information reaches the target position and achieves the target size, stopping calculation of the position and the size of each control in the current frame, wherein the target position of the control corresponding to the identification information is the center position of the interactive interface.

2. The method according to claim 1, wherein periodically calculation of the position and the size of each control in the current frame based on the preset duration comprises:
periodically obtaining a timing message; and
when the timing message is obtained, calculating the position and the size of each control in the current frame.

3. The method according to claim 2, wherein the timing message is generated periodically by a local end, or is received from an external clock.

4. The method according to claim 1, wherein the control comprises a video play control, and wherein performance of the adjustment on each control according to the control adjustment instruction comprises:
obtaining video information and graphic information of the interactive interface;
performing alpha mixing on the graphic information on a graphic layer and the video information on a video layer; and
playing the mixed media information on the video play control.

5. The method according to claim 4, comprising,
when the video play control is adjusted, obtaining a current position and a current size of the video play control in real time;
performing an adjustment on a current position and a current size of the video information on the video layer so that the current position and the current size of the video information match the current position and the current size of the video play control;
performing further alpha mixing on the graphic information on the graphic layer and the adjusted video information on the video layer; and
playing the remixed media information on the video play control.

6. The method according to claim 1, wherein,
an adjustment track is a semi-ellipse when the control is being adjusted; and
an area of a control located at a side of the interactive interface is smaller than an area of a same control located at the center position of the interactive interface.

7. An interface control system, comprising:
an instruction receiving apparatus configured to receive a control adjustment instruction, wherein the control adjustment instruction comprises identification information of a control; and
a GUI apparatus configured to perform an adjustment on each control of a plurality of controls according to the control adjustment instruction so that the control corresponding to the identification information is adjusted to a center position of an interactive interface;
an animation generation apparatus; and
a graph display apparatus;

wherein:
the animation generation apparatus is configured to periodically calculate a position and a size of each control in a current frame based on a preset duration and according to a target position and a target size of each control determined by the GUI apparatus, and
the GUI apparatus is further configured to determine the target position and the target size of each control according to the identification information, and redraw each control in the current frame according to the position and the size of each control in the current frame; and
the graph display apparatus is configured to update and display a control graph in real time according to the redrawn control.

8. The interface control system according to claim 7, further comprising:
a timer configured to generate a timing message to trigger the animation generation apparatus to perform a corresponding operation.

9. The interface control system according to claim 7, further comprising
a video source collection apparatus;
a video play apparatus, a mix apparatus; and
a play control apparatus,
wherein:
the video source collection apparatus is configured to collect video information;
the video play apparatus is configured to play the video information collected by the video source collection apparatus on a video layer;
the GUI apparatus is further configured to generate graphic information of the interactive interface, and present the graphic information on a graphic layer;
the mix apparatus is configured to obtain media information by performing alpha mixing on the graphic information on the graphic layer and the video information on the video layer; and
the play control apparatus is configured to play the media information on a video play control.

10. The interface control system according to claim 9, wherein,
the GUI apparatus is further configured to obtain a current position and a current size of the video play control in real time when the video play control is being adjusted, and send the current position and the current size of the video play control to the video play apparatus;
the video play apparatus is further configured to perform an adjustment on a current position and a current size of the video information on the video layer so that the current position and the current size of the video information match the current position and the current size of the video play control;
the mix apparatus is further configured to perform alpha mixing again on the graphic information on the graphic layer and the adjusted video information on the graphic layer; and
the play control apparatus is further configured to play the remixed media information on the video play control.

* * * * *